Jan. 23, 1968

G. HOHWART ET AL 3,365,206

WORK HOLDING CHUCK

Filed Jan. 7, 1965

INVENTORS.
George Hohwart.
Paul Toth
BY
Harness, Dickey & Pierce
ATTORNEYS.

INVENTORS.
George Hohwart
Paul Toth
BY
Harness, Dickey & Pierce
ATTORNEYS.

INVENTORS.
George Hohwart
Paul Toth
BY
Harness, Dickey & Pierce
ATTORNEYS.

Jan. 23, 1968  G. HOHWART ET AL  3,365,206
WORK HOLDING CHUCK
Filed Jan. 7, 1965  5 Sheets-Sheet 4
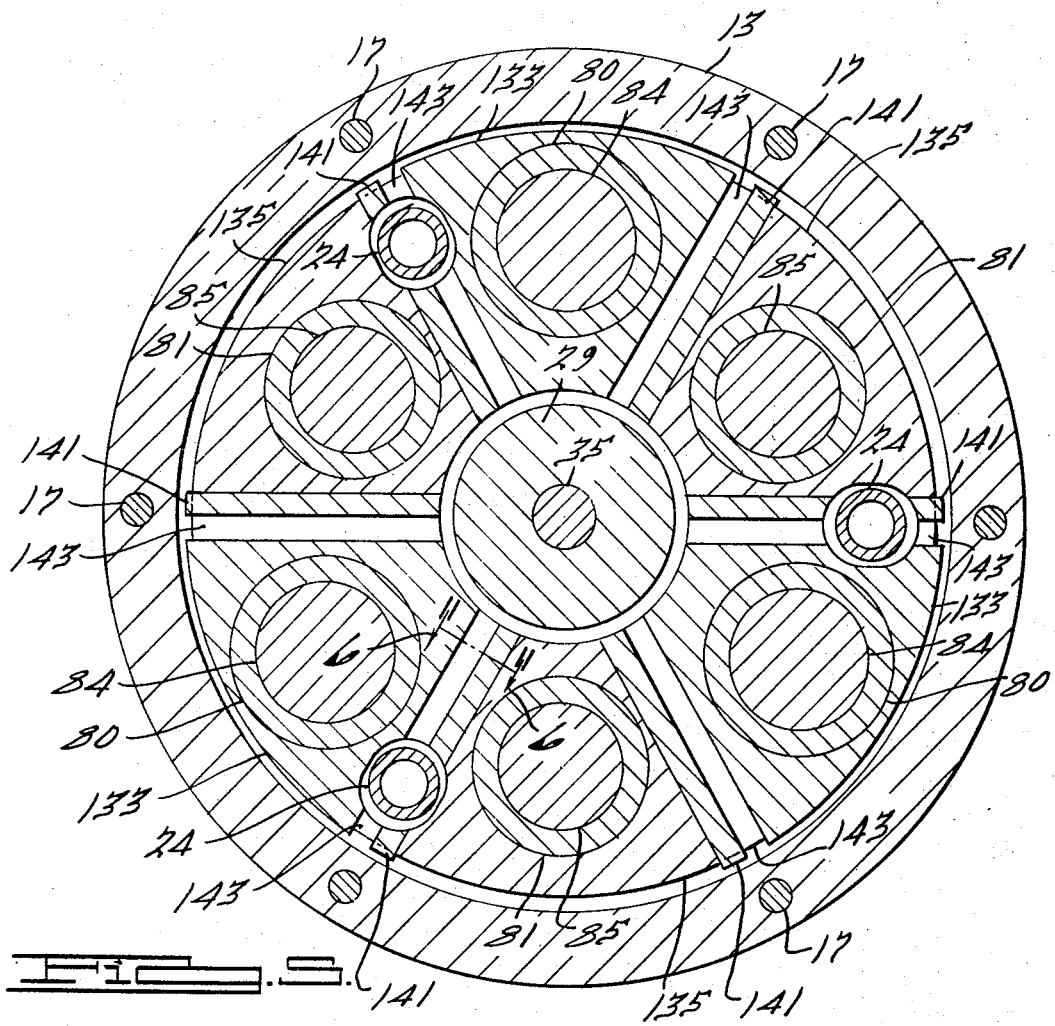
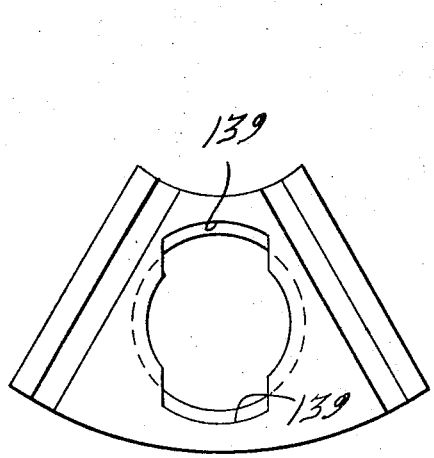
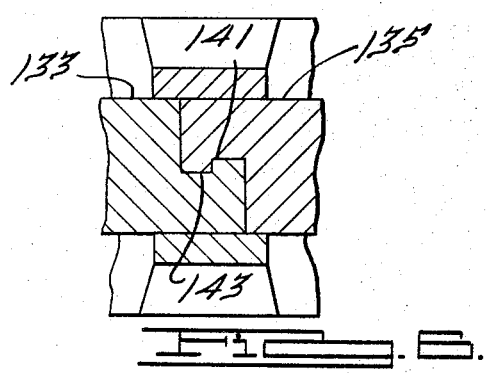
INVENTORS
George Hohwart
Paul Toth
BY
Harness, Dickey & Pierce
ATTORNEYS.

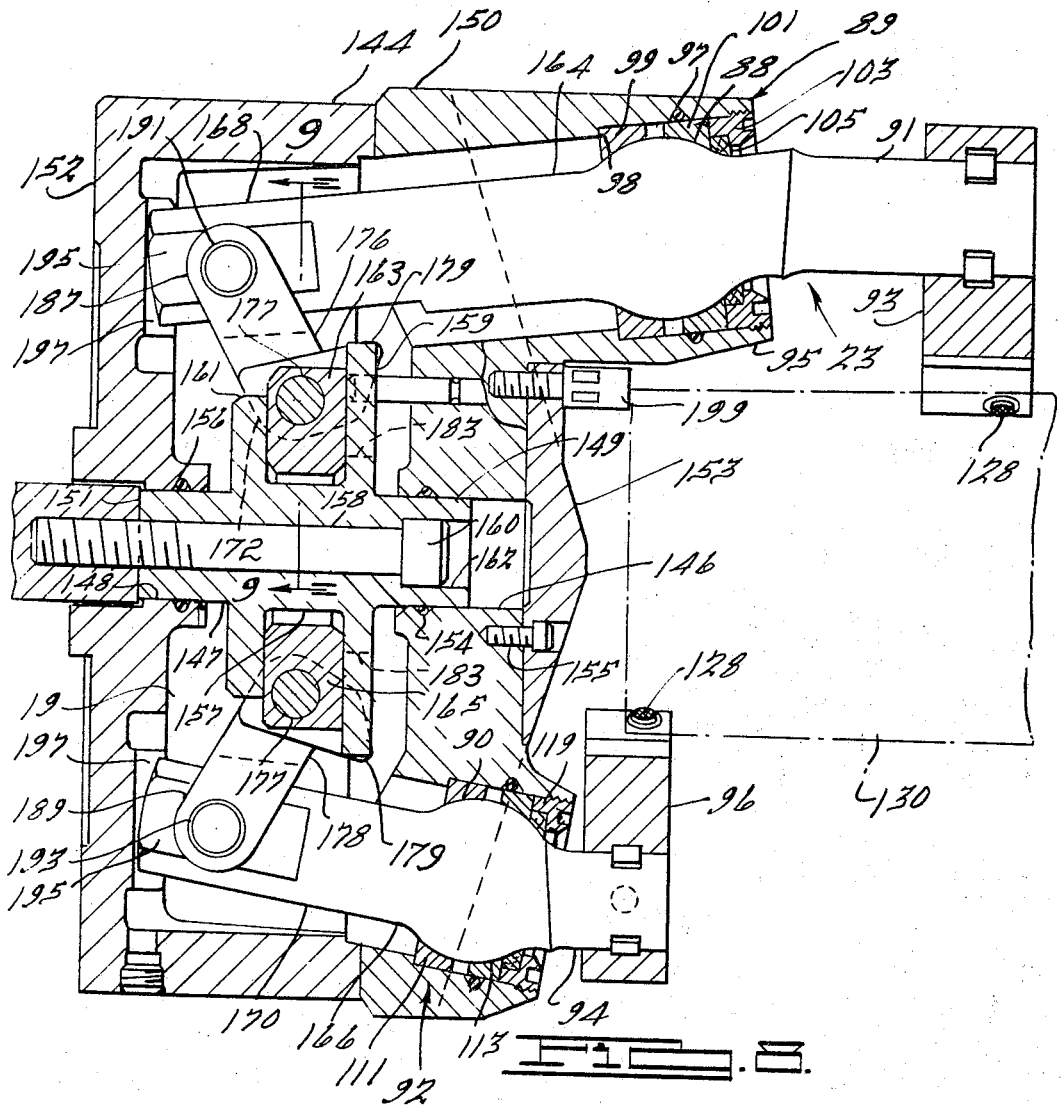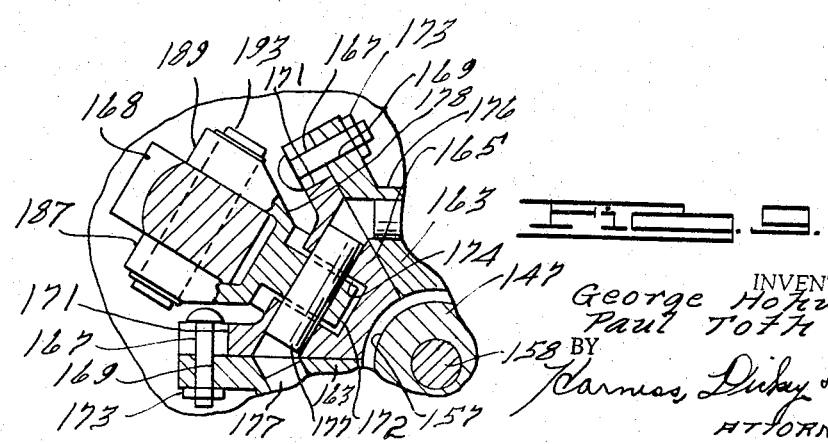

United States Patent Office 3,365,206
Patented Jan. 23, 1968

3,365,206
WORK HOLDING CHUCK
George Hohwart, Farmington, and Paul Toth, Allen Park, Mich., assignors to N. A. Woodworth Company, Ferndale, Mich., a corporation of Michigan
Filed Jan. 7, 1965, Ser. No. 423,928
21 Claims. (Cl. 279—106)

ABSTRACT OF THE DISCLOSURE

The present disclosure comprises a chuck having a plurality of work holding jaws (usually four (4) or more) on the forward ends of rocker arms mounted at the front of the chuck body for pivotal rocking movement and operated by a reciprocable common actuator through individually radially shiftable segmental members carried by the actuator and connected to rear portions of the rocker arms either directly by swivel connections or by suitable pivoted links, the arrangement being such that reciprocation of said actuator acts through said segmental members and said rocker arms to engage the work holding jaws with a workpiece or to release the same, the segmental members adapted to shift radially independently of each other upon engagement of the jaws as required to bring all of the jaws properly into clamping engagement with the workpiece.

---

This invention relates generally to chucks, and particularly to a chuck adapted to locate a workpiece at two axially spaced locations.

Chucks adapted to locate and hold a workpiece in one plane during a machining or other operation are known and are commercially available. In one form, this type of chuck includes a plurality of pivotally or swivelly mounted jaw assemblies movable from an open release position to a closed gripping position. While this type of chuck has been successful when used to hold relatively short workpieces, such is not the case with workpieces whose length is substantially greater than the length of the jaws, for during a machining operation, the workpiece is subjected to forces which, if the workpiece is not securely held, will cause it to become misaligned. In addition, an inadvertent or accidental blow to a long workpiece held only in one plane also can cause misalignment with the result that it will be improperly machined and will have to be discarded.

Thus, a chuck adapted to locate and hold a relatively long workpiece in two axially spaced planes would be extremely advantageous; however, with such a chuck, certain difficulties arise. Initially, it is necessary in any chuck operation that the jaws securely hold the workpiece but without excessive pressure that might damage the workpiece. Also, the workpiece must be properly centered within the chuck if the machining operation is to be accurately performed. However, the size and configuration of workpieces vary from one to the next because of surface irregularities and manufacturing tolerances and it is necessary, therefore, for satisfactory results that the chuck be able to compensate for these variations and yet accurately locate and securely hold the workpiece. Further, it is desirable that the chuck be compact and uncomplicated and adaptable to existing machine and spindle installations, and that the structure thereof be reliable and efficient.

Main objects, therefore, of the present invention are a chuck adapted to accurately locate relatively long workpieces centrally of the chuck in two axially spaced planes and to compensate for workpiece surface variations to securely hold the workpiece without excessive pressure at either plane.

Additional objects of the present invention are a chuck of the above character adapted for mounting on and operation with existing machine spindles, and which is relatively inexpensive to manufacture, compact and rugged in construction and reliable in operation.

Further objects and advantages of the present invention will become more apparent from a consideration of the following detailed description taken in conjunction with the drawings in which:

FIG. 5 is a transverse sectional view taken on the line 5—5 of FIG. 4;

FIG. 6 is an enlarged, fragmentary, sectional view taken on the line 6—6 of FIG. 5;

FIG. 7 is a plan view of one of the segments of the device of FIGS. 3–6;

FIG. 8 is a view similar to FIGS. 2 and 4 but showing another modified form of chuck embodying the instant invention; and FIG. 9 is a fragmentary transverse sectional view taken on the line 9—9 of FIG. 8.

Broadly described, this invention includes a chuck having two sets of axially spaced gripping jaws adapted to grip and centralize a workpiece in axially spaced planes and movable toward and away from a central axis by movement of an actuator. The operative connection between the actuator and jaws is constructed and arranged to provide equal radial movement for the jaws of each set while permitting movement of one set of jaws a different radial distance than the other set of jaws to compensate for variations in the workpiece surface.

Figure 1:
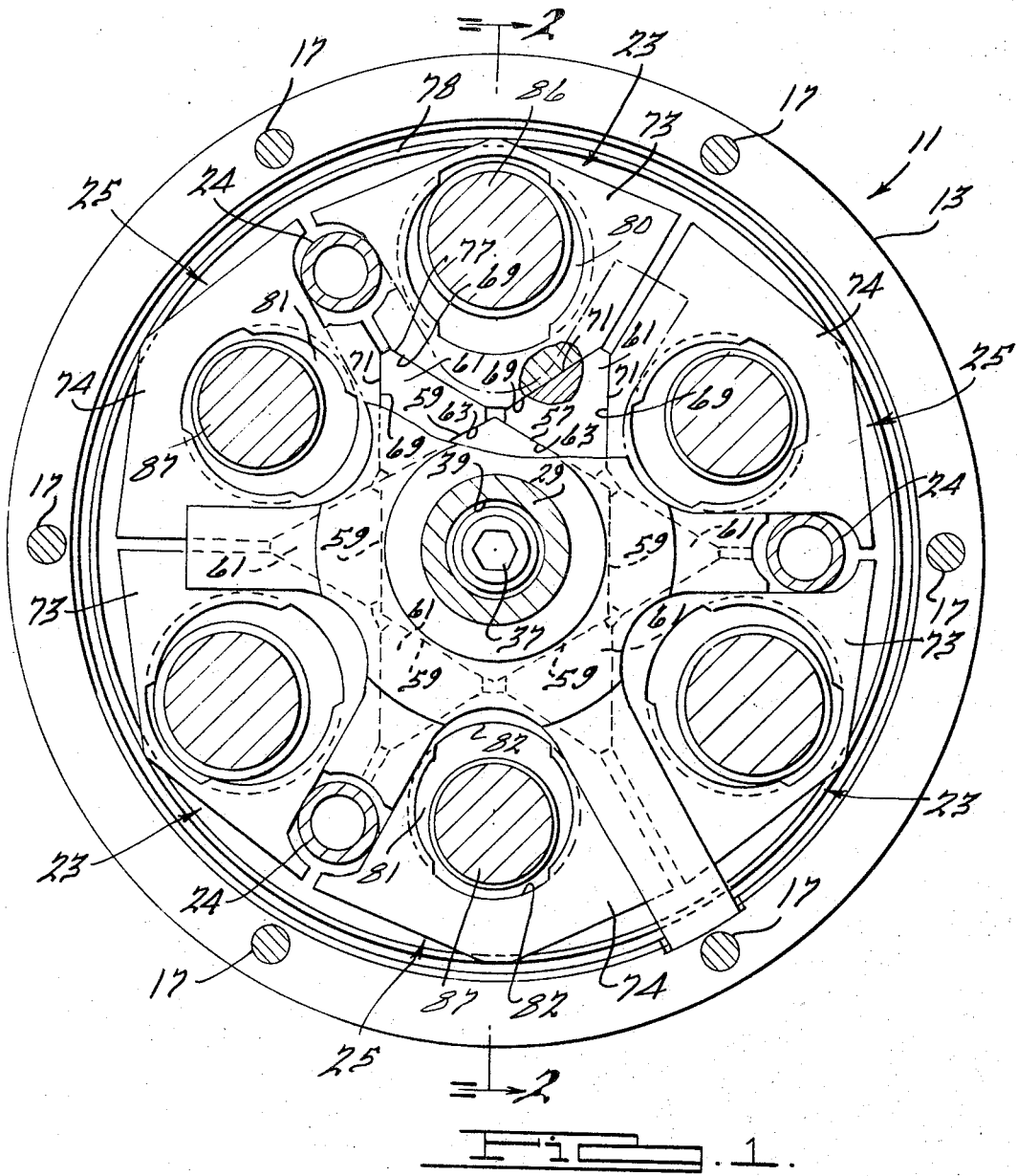
FIGURE 1 is a transverse, sectional view taken on the line 1—1 of FIG. 2 and showing a preferred form of chuck embodying the present invention.
Figure 2:
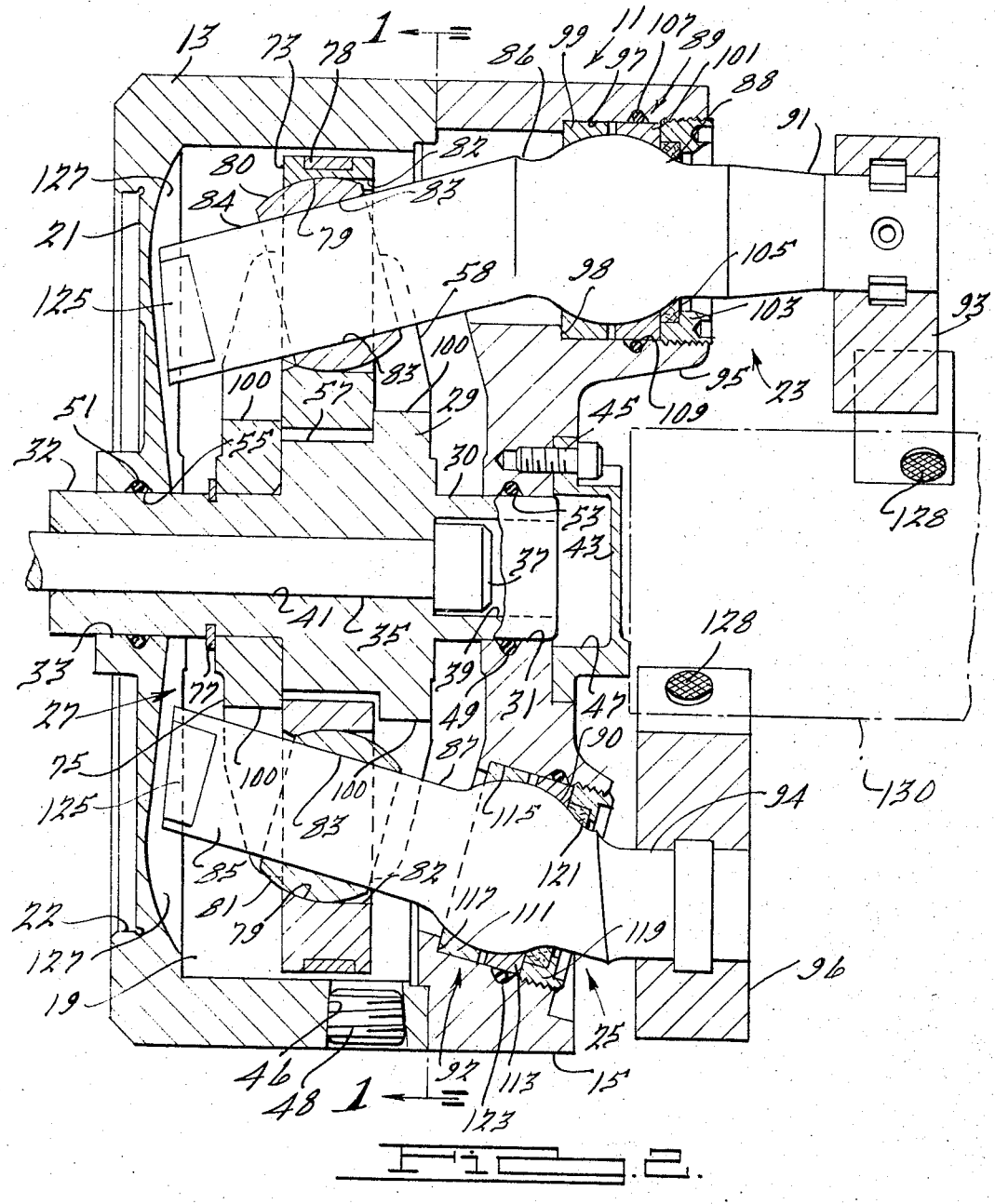
FIG. 2 is a sectional view taken on the line 2—2 of FIG. 1.

Referring now more specifically to the drawings and especially FIGS. 1 and 2, a preferred form of chuck embodying the present invention is shown generally at 11 and includes a housing 13 having a removable cover plate 15 fixed thereto by screws 17, the housing and cover together defining a chamber 19. The housing 13 includes a rear wall 21 recessed at 22 to snugly receive a machine spindle (not shown). A plurality of tubes 24 extend through the housing 13 and sealingly engage the rear wall 21 and cover plate 15 and are adapted to receive screws (not shown) for fastening the housing to the spindle. Two sets of jaw assemblies 23 and 25 are mounted for limited pivotal or swivel type movement within the housing and are motivated by movement of an actuator assembly generally indicated at 27 and positioned within the housing.

The actuator assembly 27 includes an actuator 29 having forward and rearward extensions 30 and 32 slidably supported within bores 31 and 33 formed in the cover 15 and the housing rear wall 21, respectively. A screw 35, having a head 37 positioned within a socket 39 in the extension 30, extends through a center opening 41 in the actuator 29 and fastens the actuator to a drawbar (not shown) conventionally movably mounted within the machine spindle (not shown). A cap 43 forming a workpiece end stop is removably fixed to the cover 15 by screws 45 and has a socket 47 freely receiving the actuator forward extension 30 during movement thereof.

In use, the chamber 19 is at least partially filled with a lubricant through an opening 46 in the housing 13 to minimize wear of the moving chuck parts. For this reason, it is important that the engaging faces of the housing 13 and cover 15 be accurately finished to provide a close fit and prevent fluid leakage. Conventional O-ring type seals 49 and 51 are disposed in grooves 53 and 55 in the bores 31 and 33, respectively, to sealingly engage the actuator extensions 30 and 32 and prevent the flow of fluid therepast. A plug 48 is threadedly received within and closes the opening 46.

The actuator 29 has an intermediate outer surface 57 terminated by a radially outwardly extending flange 58. The surface 57 is shown in FIG. 1 to be hexagonal in cross-section having six adjoining lands 59, each having a wedge 61 disposed thereon. Although this invention is not intended to be so limited, six lands 59 and wedges 61 are provided since the illustrated chuck has two sets of three, or six jaws. The wedges 61 are preferably triangular in configuration and these wedges and the lands 59 are staggered relative to a plurality of generally pie-shaped segments or ball carriers 73 and 74. As shown best in FIG. 1, each of the ball carriers 73 and 74 has a pair of inwardly disposed tapered surfaces 69 engaging complementary surfaces 71 on the wedges 61 to hold them on the actuator lands 59. The wedges 61 and ball carriers 73 and 74 are substantially equal in thickness and are slidably disposed between the flange 58 and a retainer ring 75 held on the rearward extension 32 of the actuator 29 by a snap ring 77. A flexible band 78 circumvents the ball carriers 73 and 74 and holds them in surrounding relation to the surface 57 and in engagement with the wedges 61.

The ball carriers 73 and 74 are substantially identical in construction and each has a spherical opening 79 forming a socket rockably receiving spherical balls 80 and 81, respectively. A pair of diametrically opposed slots 82 are formed in each of the ball carriers 73 and 74 adjacent the openings 79, so that by turning the balls 80 and 81 90 degrees on a radial axis from the position illustrated in the drawings, they are easily inserted and removed from the openings 79.

Each of the balls 80 and 81 has an axial bore 83 snugly but slidably receiving the inboard end of a plurality of rocker arms 86 and 87 of the jaw assemblies 23 and 25, respectively, the flange 58 and the retainer 75 being recessed at 100 to freely receive these inboard rocker arm ends. Thus, the balls 80 each receives an inboard end 84 of the rocker arms 86 and the balls 81 each receives an inboard end 85 of the rocker arms 87. The rocker arms 86 and 87 each has an intermediate ball portion 88 and 90 mounted for limited pivotal or swivel-type movement in a ball and socket type joint 89 and 92, respectively, positioned in the cover plate 15. The rocker arms 86 are longer than the rocker arms 87, and the arms 86 and 87 have outboard ends 91 and 94 with jaws 93 and 96 carried thereon, respectively, at spaced locations. As seen best in FIG. 2, the inboard rocker arm ends 84 and 85 are inclined relative to the chuck central axis so that the rocker arms 86 and 87 pivot or swivel within the joints 89 and 92 and the jaws 93 and 96 move radially as the actuator 29 slides axially within the housing 13 and the balls 80 and 81 slide along the inboard rocker arm ends 84 and 85.

The ball and socket joints 89 for each of the rocker arms 86 are identical and a description of one will suffice here. As seen best in FIG. 2, the cover plate 15 is formed with a boss 95 having an opening 97 and an internal shoulder 98. The ball portion 88 of the rocker arm 86 is spherical in configuration and is rockably received within a socket formed by opposed bearing races 99 and 101. The opening 97 snugly receives the bearing races 99 and 101 with the inner race 99 abutting against the shoulder 98. An annular retainer 103 is threadedly received within the opening 97 and biases the outer race 101 and the rocker arm ball 88 toward the inner race 99 to compensate for small manufacturing tolerances in the ball and races. In addition, a packing or seal 105 is held against the rocker arm ball 88 by the retainer 103 to keep the ball and socket joint free from dirt, chips and other foreign matter. A conventional O-ring 107 is positioned within a groove 109 in the opening 97 and engages the outer race 101 to prevent fluid leakage therepast.

Similarly, the ball and socket joints 92 for the rocker arms 87 each includes opposed bearing races 111 and 113 snugly received within an opening 115 formed in the cover plate 15. An internal shoulder 117 locates the inner race 111 and a retainer 119 is threadedly received within the opening 115 and biases the outer race 113 and the rocker arm ball 90 toward the inner race 111 to compensate for manufacturing tolerances. A packing or seal 121 engages the ball 90 to keep dirt, chips or other foreign matter out of the ball and socket joints 92 and a conventional O-ring 123 engages the outer race 113 to prevent fluid leakage therepast.

As the actuator 29 moves to the left, as viewed in FIG. 2, the rocker arms 86 and 87 pivot or swivel in a direction moving the outboard ends 91 and 94 and the jaws 93 and 96 radially inwardly towards a closed gripping position, the extent of this movement being a function of the inclination angle of the inboard ends and the length of the inboard and outboard ends 84 and 85 and 91 and 94, respectively. Conversely, movement of the actuator 29 to the right pivots the rocker arms 86 and 87 in a direction moving the jaw 93 and 96 radially outwardly toward an open releasing position. Each of the rocker arms 86 and 87 is formed with flats 125 which are snugly but slidably received in radial slots 127 formed in the rear wall 21 of the housing to prevent these rocker arms from turning about their longitudinal axis.

The jaws 93 and 96 can take a variety of configurations and its to be understood that the particular configuration and size of these jaws will depend upon the configuration and size of the workpiece upon which they are to be used. However, a preferred jaw configuration is illustrated in FIG. 2. As shown there, each of the jaws 93 and 96 is provided with spaced workpiece engaging elements, such as, for example, jaw inserts 128 constructed to grip a workpiece 130 at two angularly spaced locations. The jaws 93 and 96 are carried upon the outboard ends 91 and 94 of the rocker arms 86 and 87, respectively, for limited pivotal or rocking movement about the longitudinal axis thereof. For a more detailed description of this particular jaw mounting, reference may be made to the U.S. patent to George Hohwart et al. No. 3,104,886, granted Sept. 24, 1963, and owned by the assignee of the present application. Suffice it to say here that the jaws 93 and 96 can rock to a limited extent about the rocker arm longitudinal axis to permit the inserts 128 of each jaw to grip the workpiece 130 with equal pressure. In addition, as described above, the rocker arms 86 are longer than the rocker arms 87 so that the jaws 93 grip the workpiece at a location spaced axially from the jaws 96.

According to the principles of the present invention, the jaw assemblies 23 and 25 automatically compensate for small variations in workpiece dimensions at the two chucking locations and function to accurately center and firmly hold the workpiece at both areas without excessive pressure at either location. Thus, as seen in FIG. 1, the ball carriers 73 are staggered relative to the carriers 74 and each is normally restrained against radial movement on the actuator 29 by cooperative engagement with the wedges 61 resting on the lands 59 and by the flexible band 78. However, when a force is applied to one set of the ball carriers 73 or 74 sufficient to move it radially on the the actuator, such as, for example, a force sufficient to move the carriers 73 radially inwardly, the carrier surfaces 69 can slide inwardly on the wedge surfaces 71 and the wedges 61 can slide laterally along the flats 59 in a direction away from the carriers 73 and toward the adjacent carriers 74. As the carriers 73 move radially inwardly, they move away from the flexible band 78 so that the carriers 74 can distort the band 78 outwardly adjacent thereto and move radially outwardly of the actuator 29 and away from the displaced wedges 61.

Similarly, if a force is exerted on the carriers 74 sufficient to move them radially inwardly of the actuator 29, the wedges 61 are displaced toward the carriers 73 moving them radially outwardly with the band 78 flexing and distorting outwardly adjacent the midpoint of each of the carriers 73. In both of the above instances, the carriers 73 and 74, the wedges 61, and the band 78 return to the position illustrated in FIG. 1 upon release of the radial forces on the carriers 73 and 74.

The effect of this relatively radially movable arrangement for the ball carriers 73 and 74 to permit the jaws 93 and 96 to undergo modified radial movement as the actuator 29 moves axially within the chuck. Specifically, as the actuator 29 moves to the left, as viewed in FIG. 2, the jaws 93 and 96 move radially inwardly toward the workpiece. After the workpiece is gripped by the jaws, continued movement of the actuator 29 to the left causes a force to be directed on the carriers 73 and 74 tending to move them radially inwardly on the actuator. Of course, if the jaws 93 and 96 simultaneously grip the workpiece, the wedges 61 engaging the actuator surface 57 and the carrier surfaces 69 prevent any radial inward movement of the carriers from occurring. If, however, one set of jaws contacts the workpiece before the other, then the ball carriers 73 and 74 move radially relative to each other on the actuator until the other set of jaws contacts the workpiece. Thereafter, both sets of jaws 93 and 96 are moved radially inwardly to simultaneously increase the gripping force on the workpiece by each of the jaws. For example, if the jaws 93 grip the workpiece before the jaws 96, continued movement of the actuator 29 to the left causes a radially inward force to be directed on the carriers 73 since further pivotal or swivel type movement of the rocker arms is resisted after the jaws 93 engage the workpiece. Thus, the carriers 74 are forced radially outwardly by the displaced wedges 61 thereby increasing the radial inward movement imparted to the jaws 96 by actuator movement. This continues until both sets of jaws 93 and 96 grip the workpiece, whereupon both sets of carriers are subjected to forces tending to move them radially inwardly. Further movement of the actuator 29 to the left serves to increase the gripping pressure between the jaws 93 and 96 and the workpiece at a rate which is a function of the relative inclination angles of the inboard rocker arm portions 84 and 85, and by the relative lengths of the inboard and outboard rocker arm portions 84 and 91, and 85 and 94. Similarly, if the jaws 96 grip the workpiece first, then the ball carriers 74 are moved radially inwardly as the actuator 29 moves to the left and the carriers 73 are moved radially outwardly until jaws 93 grip the workpiece as described above.

In actual use, the rocker arms 86 and 87 and the jaws 93 and 96 are selected according to the size of the particular workpiece to be chucked so that the jaws ideally will grip the workpiece substantially simultaneously during actuator movement. In that instance, substantially no relative radial movement occurs between the ball carriers 73 and 74. However, relative movement permitted the ball carriers 73 and 74 and described above compensates automatically for dimensional variations in these workpieces at the two chucking areas as a result of dimensional tolerances and/or surface irregularities and provides a substantially equal gripping force at each set of jaws.

Each of the rocker arms 86 and 87, during its movement, passes through a position in which the outboard ends 91 and 94 are parallel to the chuck axis. Consequently, during the final portion of the pivotal or swivel type movement of each rocker arm, the jaws 93 and 96 follow a curved path which has a component in a direction toward the cover plate 15 and parallel to the chuck axis. As a result, the workpiece is gripped by the jaws 93 and 96 and moves rearwardly toward the plate 15 into tight engagement with the end stop 43 to thereby stabilize the support of the workpiece on the chuck 11. The engagement of the end stop 43 with the workpiece has the additional advantage that the end stop 43 can also impart rotational forces from the chuck to the workpiece.

The workpiece is readily released by moving the actuator 29 to the right, as viewed in FIG. 2, thereby pivoting or swiveling the rocker arms in a reverse direction and moving the jaws 93 and 96 radially outwardly. As described above, the band 78 returns the ball carriers 73 and 74 to the position shown in FIG. 1 if any relative radial movement had occurred therebetween during the chucking.

A modified form of chuck calculated to fulfill the principles of the present invention is shown in FIGS. 3–7 and since the housing and cover plate, the rocker arms and the jaw arrangement are substantially identical to that illustrated in FIGS. 1 and 2, a detailed description of these components is omitted here and the same numerals here represent identical parts.

Figure 4:
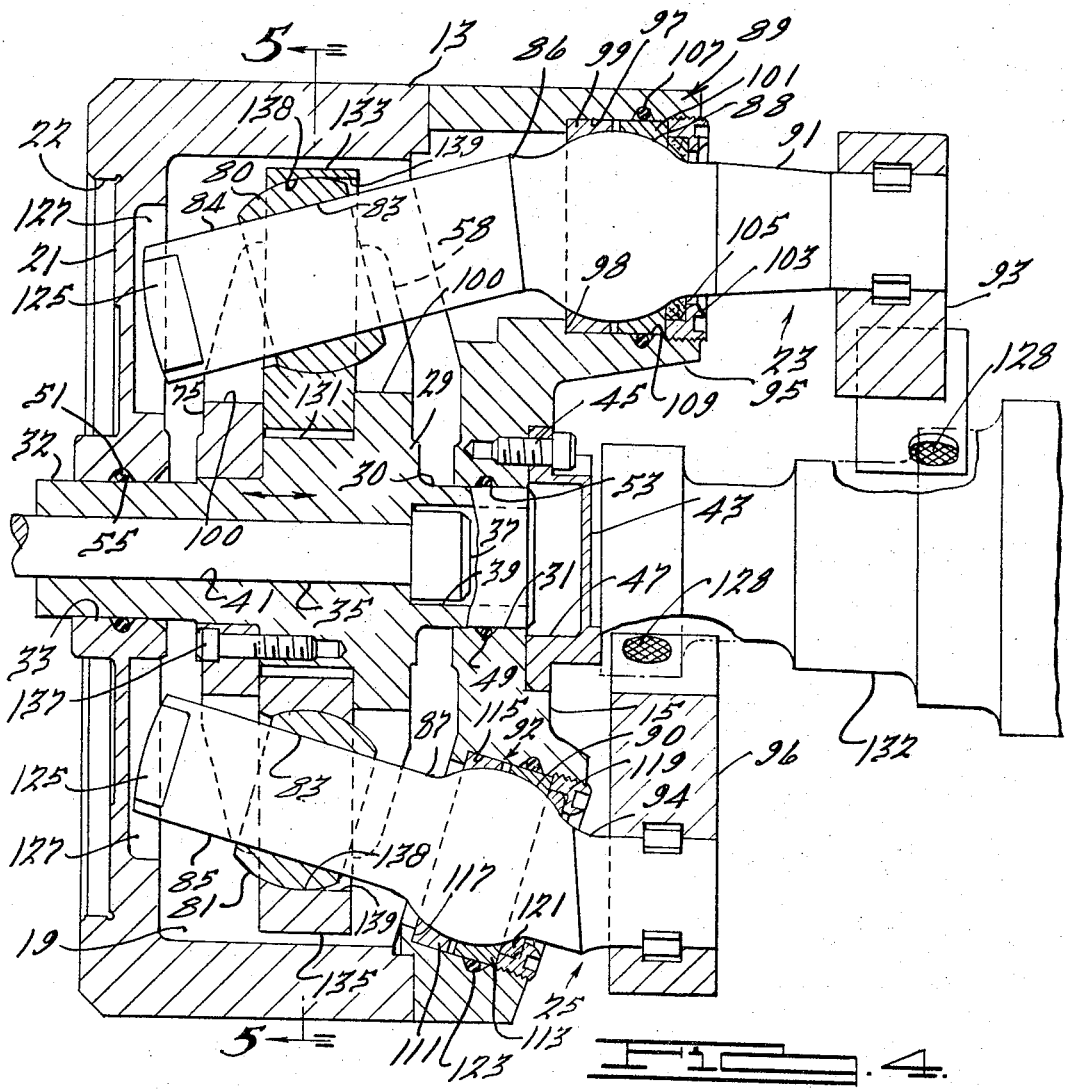
FIG. 4 is an enlarged longitudinal sectional view taken on the line 4—4 of FIG. 3.
Figure 3:
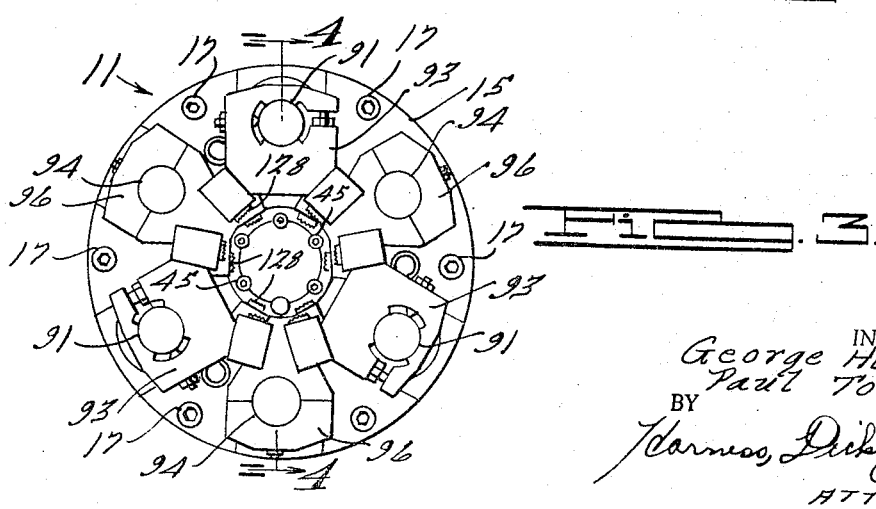
FIG. 3 is a front elevational view showing a modified form of chuck embodying the present invention.

The basic structural difference between the chuck of FIGS. 1 and 2 and that of FIGS. 3–7 lies in the ball carriers and the manner in which they are interrelated and disposed on the actuator. Thus, as seen in FIG. 4, the actuator. Thus, as seen in FIG. 4, the actuator 29 has an intermediate outer cylindrical surface 131 terminated by the radially extending flange 58. Two sets of three, or six, pie-shaped segments or ball carriers 133 and 135 are disposed in surrounding relation to the surface 131 and are slidably positioned between the flange 58 and the retaining ring 75 shown here as held in place by screws 137. Each of the carriers 133 and 135 has a spherical opening 138 forming a socket receiving the balls 80 and 81 for pivotal or swivel type movement therein, and the balls 80 and 81 each have a bore 83 slidably receiving the inboard ends 84 and 85 of the rocker arms 86 and 87, respectively. As in the ball carriers 73 and 74 of the chuck of FIGS. 1 and 2, the carriers 133 and 135 each have diametrically opposed slots 139 formed adjacent the spherical openings 137 to permit easy insertion and removal of the balls 80 and 81. See FIG. 7.

The ball carriers 133 and 135 are each interconnected with adjacent ones of the other ball carriers in a manner calculated to achieve the objects of the instant invention. As shown perhaps best in FIG. 6, the carriers 133 and 135 are loosely hooked together for relative sliding movement radially of the actuator 29 by complementary-shaped generally radially extending fingers 141 and 143. Thus, as in the chuck of FIGS. 1 and 2, the actuator 29 is moved to the left to pivot the rocker arms 86 and 87 in a direction to move the outboard ends 91 and 94 and the jaws 93 and 96 radially inwardly.

If the jaws 93 and 96 grip the workpiece 132 simultaneously, continued movement of the actuator 29 to the left causes a radial inward force to be directed on each of the carriers 133 and 135. However, because of their general pie-shaped configuration, no relative radial movement therebetween can occur. If, however, the jaws 93 engage the workpiece first, continued movement of the actuator 29 to the left causes a radially inward force to be directed on the carriers 133. At the same time, the jaws 96 have not yet contacted the workpiece and the carriers 135 are free to move radially outwardly on the actuator 29 which they will do under a radial outward force directed thereon by the inboard ends 85 of the rocker arms 87 during actuator movement. After the jaws 96 contact the workpiece, further movement of the actuator 29 to the left serves to increase the gripping force of both sets of jaws 93 and 96 on the workpiece and moves it back against the end stop 43. If, on the other hand, the jaws 96 grip the workpiece 132 before the jaws 93, the ball carriers 135 move radially inwardly during movement of the actuator to the left and the carriers 133 move radially outwardly thereof until both sets of jaws grip the workpiece as above.

It is noted here that the workpiece 132 illustrated in FIG. 4 differs from that shown in FIG. 2 in that the workpiece 132 is gripped on different diameters by the jaws 93 and 96. However, this invention applies equally to both types of workpiece, it only being necessary to change jaws or rocker arms, or both, to suit the particular needs arising in use.

The workpiece 132 is released, as above, by moving the actuator 29 to the right, whereupon the rocker arms 86 and 87 swing outwardly and the jaws 93 and 96 move radially outwardly. If any relative radial movement has occurred between the carriers 133 and 135 during the chucking sequence, they return to their normal positions, as shown in FIG. 5, during movement of the rocker arms 86 and 87 and jaws 93 and 96 to their open releasing position.

Another modified form of chuck calculated to fulfill the objects and principles of this invention is illustrated in FIGS. 8 and 9 and since the rocker arm swivel mountings and jaw structure thereon is substantially identical to that of FIGS. 1 and 2, and FIGS. 3–7, a detailed description is omitted here and like numerals indicate like parts.

In this modification, a modified housing 144 encloses the inboard ends 168 and 170 of the rocker arms 164 and 166, respectively, which are operatively connected to a modified form of actuator 147 having forward and rearward extensions 149 and 151 slidably disposed within openings 146 and 148 formed in a cover plate 150 and a housing rear wall 152, respectively. As in the forms of this invention illustrated and described above, a pair of O-ring seals 154 and 156 sealingly engage the actuator extensions or end portions 149 and 151, respectively. A screw 158 connects the actuator 147 to a spindle draw bar (not shown) and a head portion 160 of the screw is received within a socket 162 in the actuator extension 149 and is accessible for loosening or tightening by removing an end cap 153 removably attached to the housing cover plate 150 by screws 155.

The actuator 147 has an intermediate generally cylindrical surface 157 bounded by fore and aft generally radially extending flanges 159 and 161. Two pairs of three, or six, V-shaped spiders 163 and 165 are staggered in surrounding relation to the actuator surface 157 and are aligned with the two sets of rocker arms 164 and 166 at their inboard ends 168 and 170, respectively. The spiders 163 and 165 are radially slidable between the flanges 159 and 161 and are loosely held together by bolts 167 threaded into openings 169 in the ends of the spiders 163 and extending through slots 171 in the adjacent ends of the spiders 165. A nut 173 is threaded on the end of each of the bolts 167 to lock them in place. Each of the spiders 163 and 165 is, therefore, slidable relative to the adjacent spiders in a direction radially of the actuator 147 in a manner similar to the ball carriers 73 and 74, and 133 and 135 in the structures of FIGS. 1 and 2 and FIGS. 3–7, respectively.

Two sets of three, or six, yokes 176 and 178 interconnect the spiders 163 and 165 and the rocker arms 164 and 166, respectively, and each has a leg 172 and a spaced pair of ears 187 and 189, respectively. As shown in FIGS. 8 and 9, the yoke legs 172 are freely received within slots 174 in the spiders 163 and 165, respectively, pivotally attached thereto by a pivot pin 177. A dog 179 extends forwardly of each of the yoke legs 172 and all of the dogs are snugly received within slots 183, formed in the front spider flange 159 to keep the spiders 163 and 165 and yokes 176 and 178 from being angularly displaced which might cause them to bind during use. The yoke ears 187 and 189 snugly receive and are pivotally attached to the inboard ends 168 and 170 of the rocker arms 164 and 166 by pivot pins 191 and 193, respectively. As was the case with the rocker arms of the devices of FIGS. 1 and 2 and FIGS. 3–7 described above, the inboard rocker arm ends 168 and 170 have flats 195 snugly but slidably received within generally radially extending slots 197 in the housing rear wall 152.

In use, movement of the actuator 147 to the left, as viewed in FIG. 8, swings the legs 172 of the yokes 176 and 178 also to the left as viewed in the figure. Since the rocker arms 164 and 166 are held by the ball and socket joints 89 and 92, the yoke ears 187 and 189 swing radially outwardly thereby pivoting or swiveling the rocker arms 164 and 166 and the jaws 93 and 96 toward a closed gripping position. If the jaws 93 engage the workpiece before the jaws 96, a force is directed on the spiders 163 tending to move them radially inwardly on the actuator 147. Thus, as the actuator 147 continues moving to the left, the spiders 165 being free to move as the jaws 96 have not yet gripped the workpiece move radially outwardly while the spiders 163 move radially inwardly until the jaws 96 do grip the workpiece. Thereafter, pressure builds up between the jaws 93 and 96 and the workpiece, as described above, is moved against a plurality of end stops 199 extending through the end cap 153 and threadedly received in the housing cover 150. Similarly, if the jaws 96 grip the workpiece first, then the spiders 165 move radially inwardly and the spiders 163 radially outwardly on the actuator 147 until the jaws 93 grip the workpiece.

As was the case above, the workpiece is released by moving the actuator 147 to the right which, in turn, moves the jaws 93 and 96 to an open releasing position and the spiders 163 and 165 return to their normal positions.

While preferred embodiments of the present invention have been illustrated and described in detail above, various additions, substitutions, modifications and omissions may be made thereto without departing from the spirit of the invention as encompassed by the appended claims.

What is claimed is:

1. A chuck comprising
    a body,
    axially spaced sets of jaw assemblies for engaging a workpiece at two different locations,
    each jaw assembly having a work engaging jaw and a rocker arm,
    each rocker arm being attached to said body intermediate the ends of the arm by a swivel connection and having a portion thereof inclined with respect to the axis of the chuck,
    all of said jaw assemblies being disposed concentrically around the center of said chuck and the jaw assemblies of one set being staggered with respect to the jaw assemblies of the other set,
    equalizing segments carrying swivel mountings mounted for sliding movement on the inclined portions of said rocker arms,
    and an actuator including means holding said segments against lateral movement bodily relative to each other while permitting the same to move freely in a radial direction and operable to move said segments simultaneously bodily axially of said chuck.

2. A chuck comprising
    a body,
    an actuator mounted for reciprocation along a longitudinal axis within said body,
    a first set of three equidistantly spaced work engaging jaws arranged concentrically to said longitudinal axis and adapted to engage a workpiece at one axial position therealong,
    a pivotally mounted first set of rocker arms each carrying a respective one of said first set of jaws and each having a first portion extending within said body,
    a first set of three equidistantly spaced segments carried by said actuator and radially movable relative thereto,
    means interconnecting said first set of segments and the first portions of said first set of rocker arms for relative longitudinal and pivotal movement therebetween whereby movement of said actuator along said axis imparts pivotal movement to said rocker arms, a second set of three equidistantly spaced work engaging jaws arranged between the jaw elements of said first set and concentric with the body axis and adapted to engage a second axial portion of said workpiece, a pivotally mounted second set of rocker arms each carrying a respective one of said jaws of said second set and each having a first portion extending within said body, a second set of three equidistantly spaced segments carried by said actuator and arranged between and operatively engaging the first set of segments and radially movable relative thereto, means interconnecting said arcuate second segments and the first portions of said second rocker arms for relative longitudinal and pivotal movement therebetween, whereupon movement of said actuator along said axis imparts pivotal movement to said rocker arms through said first and second sets of segments and engagement of said workpiece by one set of jaws prior to the other set of jaws causes relative radial movement between said first and second sets of jaws and thereby relative movement between said first and second sets of segments through relative pivotal movement of their respective rocker arms whereby said workpiece is equally pressurized by said first and second sets of jaws.

3. A chuck comprising a body, an actuator mounted for reciprocation along a longitudinal axis within said body, a first set of equidistantly spaced work engaging jaws arranged concentrically with said longitudinal axis adapted to engage a first portion of a workpiece, a pivotally mounted first set of rocker arms carrying a respective one of said first set of jaws and each having a portion inclined relative to said axis extending within said body, a first set of segments carried by said actuator and radially movable relative thereto, sliding swivel means interconnecting said first set of segments to the inclined portion of a respective one of said first set of rocker arms to cause pivotal movement of said rocker arms as said actuator moves along said axis, a second set of equidistantly spaced work engaging jaws arranged between the jaw elements of said first set and concentric with said axis and adapted to engage a second portion of said workpiece spaced from said first portion along said axis, a pivotally mounted second set of rocker arms carrying a respective one of said second set of jaws and having a portion inclined relative to said axis extending within said body, a second set of segments carried by said actuator and arranged between and operatively engaging said first set of segments and radially movable relative thereto, sliding swivel means interconnecting said second set of segments and an inclined portion of a respective one of said second set of rocker arms to cause pivotal movement of said second rocker arms as said actuator moves along said axis, whereupon movement of said actuator along said axis imparts pivotal movement to said rocker arms through said first and second sets of segments and engagement of said workpiece by one set of jaws prior to the other set of jaws causes relative radial movement between said first and second sets of jaws and thereby relative movement between said first and second sets of segments through relative pivotal movement of their respective rocker arms whereby said workpiece is equally pressurized by said first and second sets of jaws.

4. A chuck comprising a body, an actuator mounted for reciprocation along a longitudinal axis within said body, a first set of three equidistantly spaced work engaging jaws arranged concentrically with said longitudinal axis and adapted to engage a first portion of a workpiece, a pivotally mounted first set of rocker arms carrying a respective one of said jaws of said first set and each having a portion inclined relative to said axis extending within said body, a first set of equidistantly spaced segments carried by said actuator and radially movable relative thereto, sliding swivel means interconnecting said first set of segments to the inclined portion of a respective one of said first set of rocker arms to cause pivotal movement of said rocker arms as said actuator moves along said axis, a second set of three equidistantly spaced work engaging jaws arranged between the jaw elements of said first set and concentric with said axis and adapted to engage a second portion of said workpiece spaced along said axis from said first portion, a pivotally mounted second set of rocker arms carrying a respective one of said second set of jaws and having a portion inclined relative to said axis extending within said body, a second set of equidistantly spaced segments carried by said actuator and arranged between and operatively engaging said first set of segments and radially movable relative thereto, sliding swivel means interconnecting said second set of segments and an inclined portion of a respective one of said second set of rocker arms to cause pivotal movement of said second rocker arms as said actuator moves along said axis, whereupon movement of said actuator along said axis imparts pivotal movement to said rocker arms through said first and second sets of segments and engagement of said workpiece by one set of jaws prior to the other set of jaws causes relative radial movement between said first and second sets of jaws and thereby relative movement between said first and second sets of segments through relative pivotal movement of their respective rocker arms whereby said workpiece is equally pressurized by said first and second sets of jaws.

5. A chuck comprising a body, an actuator mounted for reciprocation along a longitudinal axis within said body, a first set of three equidistantly spaced work engaging jaws arranged concentrically with said longitudinal axis and adapted to engage a first portion of a workpiece, a pivotally mounted first set of rocker arms carrying a respective one of said jaws and each having a portion extending within said body, a first set of equidistantly spaced segments carried by said actuator and radially movable relative thereto, sliding swivel means interconnecting said first set of segments with the first portion of a respective one of said first set of rocker arms to cause pivotal movement of said rocker arms as said actuator moves along said axis, a second set of three equidistantly spaced work engaging jaws arranged between the jaw elements of said first set and concentric with said axis and adapted to engage a second portion of said workpiece spaced along said axis from said first portion, a second set of rocker arms carrying a respective one of said jaws of said second set and having a first portion extending within said body, a second set of equidistantly spaced segments carried by said actuator and arranged between and operatively engaging said first set of segments and radially movable relative thereto, sliding swivel means interconnecting said second set of segments and the first portion of a respective one of said second set of rocker arms to cause pivotal movement of said second set of rocker arms as said actuator moves along said axis, whereupon movement of said actuator along said axis imparts pivotal movement to said rocker arms through said first and second sets of segments and engagement of said workpiece by one set of jaws prior to the other set of jaws causes relative radial movement between said first and second sets of jaws and thereby relative movement between said first and second sets of segments through relative pivotal movement of their respective rocker arms whereby said workpiece is equally pressurized by said first and second sets of jaws.

6. A chuck comprising a body, an actuator mounted for reciprocation along a longitudinal axis within said body, a first set of equidistantly spaced work engaging jaws arranged concentrically with said longitudinal axis and adapted to engage a first portion of a workpiece, a pivotally mounted first set of rocker arms carrying a respective one of said jaws of said first set and each having a portion inclined relative to said axis extending within said body, a first set of segments carried by said actuator and radially movable relative thereto, sliding swivel means interconnecting said first set of segments to the inclined portion of a respective one of said first set of rocker arms to cause pivotal movement of said rocker arms as said actuator moves along said axis, a second set of equidistantly spaced work engaging jaws arranged between and spaced radially from the jaw elements of said first set and concentric with said axis and adapted to engage a second portion of said workpiece spaced axially from said first portion and having a different diameter than said first portion, a pivotally mounted second set of rocker arms carrying a respective one of said jaws of said second set and having a portion inclined relative to said axis extending within said body, a second set of segments carried by said actuator and arranged between and operatively engaging said first set of segments and radially movable relative thereto, sliding swivel means interconnecting said second set of segments and an inclined portion of a respective one of said rocker arms of said second set to cause pivotal movement of said second rocker arms as said second actuator moves along said axis, whereupon movement of said actuator along said axis imparts pivotal movement to said rocker arms through said first and second sets of segments and engagement of said workpiece by one set of jaws prior to the other set of jaws causes relative radial movement between said first and second sets of jaws and thereby relative movement between said first and second sets of segments through relative pivotal movement of their respective rocker arms whereby said workpiece is equally pressurized by said first and second sets of jaws.

7. A chuck comprising a body, an actuator mounted for reciprocation along a longitudinal axis within said body, a first set of equidistantly spaced work engaging jaws arranged concentrically with said longitudinal axis and adapted to engage a first portion of a workpiece, a first set of rocker arms each mounted within a fixed swivel in said body and carrying a respective one of said first set of jaws and each having a portion inclined relative to said axis extending within said body, a first set of segments carried by said actuator and radially movable relative thereto, sliding swivel means interconnecting said first segments with the inclined portion of a respective one of said first set of rocker arms to cause pivotal movement of said rocker arms as said actuator moves along said axis, a second set of equidistantly spaced work engaging jaws arranged between the jaw elements of said first set and concentric with said axis and adapted to engage a second portion of said workpiece spaced axially from said first portion, a second set of rocker arms each mounted within a fixed swivel in said body and carrying a respective one of said second set of jaws and having a portion inclined relative to said axis extending within said body, a second set of segments carried by said actuator and arranged between and operatively engaging said first set of segments and radially movable relative thereto, sliding swivel means interconnecting said second set of segments and an inclined portion of a respective one of said second set of rocker arms to cause pivotal movement of said second set of rocker arms as said actuator moves along said axis, whereupon movement of said actuator along said axis imparts pivotal movement to said rocker arms through said first and second sets of segments and engagement of said workpiece by one set of jaws prior to the other set of jaws causes relative radial movement between said first and second sets of jaws and thereby relative movement between said first and second sets of segments through relative pivotal movement of their respective rocker arms whereby said workpiece is equally pressurized by said first and second sets of jaws.

8. A chuck comprising a body, an actuator mounted for reciprocation along a longitudinal axis within said body, a first set of equidistantly spaced work engaging jaws arranged concentrically with said longitudinal axis and adapted to engage a first portion of a workpiece, a pivotally mounted first set of rocker arms carrying a respective one of said first set of jaws and each having a portion inclined relative to said axis extending within said body, a first set of segments carried by said actuator and radially movable relative thereto, means pivotally interconnecting said first set of segments with the inclined portion of a respective one of the first rocker arms allowing slidable movement therebetween and causing said rocker arms to pivot as said actuator moves along said axis, a second set of equidistantly spaced work engaging jaws arranged between the jaw elements of said first and concentric with said axis and adapted to engage a second portion of said workpiece spaced axially from said first portion, a pivotally mounted second set of rocker arms carrying a respective one of said jaws of said second set and each having a portion inclined relative to said axis extending within said body, a second set of segments carried by said actuator and radially movable relative thereto and arranged between and operatively engaging said first set of segments, flexible annular means surrounding said first and second sets of segments and engaging an outer portion thereof whereby movement of one set of segments in one radial direction relative to said axis imparts radial movement to the other set of segments in the opposite radial direction, means pivotally interconnecting said second segments and the inclined portion of a respective one of said second set of rocker arms allowing slidable movement therebetween and causing said second rocker arms to pivot as said actuator moves along said axis, whereupon movement of said actuator along said axis imparts pivotal movement to said rocker arms through said first and second sets of segments and engagement of said workpiece by one set of jaws prior to the other set of jaws prevents further movement of said one set of jaws until the other set of jaws engages said workpiece through relative radial movement between said first and second sets of segments whereby said workpiece is equally pressurized by said first and second set of jaws.

9. A chuck comprising a body, an actuator mounted for reciprocation along a longitudinal axis within said body, a first set of equidistantly spaced work engaging jaws arranged concentrically to said longitudinal axis and adapted to engage a first portion of a workpiece, a pivotally mounted first set of rocker arms each carrying a respective one of said first set of jaws and each having a portion inclined relative to said axis extending within said body, a first set of segments carried by said actuator and radially movable relative thereto, means pivotally interconnecting said first set of segments with the incliined portions of said first rocker arms allowing slidable movement therebetween and causing said rocker arms to pivot as said actuator moves along said axis, a second set of equidistantly spaced work engaging jaws arranged between the jaw elements of said first set and concentric to said axis and adapted to engage a second portion of said workpiece spaced axially from said first portion, a pivotally mounted second set of rocker arms each carrying a respective one of said jaws of said second set and each having a portion inclined relative to said axis extending within said body, a second set of segments carried by said actuator and radially movable relative thereto and arranged between and operatively engaging said first set of segments, each segment of said first and second sets of segments having a pair of opposed tapered side face portions converging toward the inner portion thereof, wedge means interposed between adjacent ones of the first and second sets of segments slidably movable on said actuator and having outwardly directed side face portions normally substantially coextensive with the tapered side face portions of said first and second sets of segments, flexible annular means surrounding said first and second sets of segments and engaging an outer portion thereof whereby movement of one set of segments in one radial direction relative to said axis imparts lateral movement to said wedge means and radial movement to the other set of segments in the opposite direction, means pivotally interconnecting said second set of segments and the inclined portions of said second set of rocker arms allowing slidable movement therebetween and causing said second set of rocker arms to pivot as said actuator moves along said axis, whereupon movement of said actuator along said axis imparts pivotal movement to said rocker arms through said first and second sets of segments and engagement of said workpiece by one set of jaws prior to the other set of jaws prevents further movement of said one set of jaws until the other set of jaws engages said workpiece through relative radial movement between said first and second sets of segments whereby said workpiece is equally pressurized by said first and seconds sets of jaws.

10. A chuck comprising a body, an actuator mounted for reciprocation along a longitudinal axis within said body, a first set of equidistantly spaced work engaging jaws arranged concentrically to said longitudinal axis and adapted to engage a first portion of a workpiece, a pivotally mounted first set of rocker arms each carrying a respective one of said first set of jaws and each having a portion extending within said body, a first set of segments carried by said actuator and radially movable relative thereto, toggle links pivotally connected at one end thereof to said segments of said first set and at the other end thereof to the mentioned portions of said first set of rocker arms allowing relative movement therebetween and causing said rocker arms to pivot as said actuator moves along said axis, a second set of equidistantly spaced work engaging jaws arranged between the jaw elements of said first set and concentric to said axis and adapted to engage a second portion of said workpiece spaced axially from said first portion, a pivotally mounted second set of rocker arms each carrying a respective one of said jaws of said second set and each having a portion extending within said body, a second set of segments carried by said actuator and radially movable relative thereto and arranged alternately with respect to the segments of said first set, means associated with said first and second sets of segments holding the same against lateral separating movement relative to each other while permitting relative radial movement therebetween, toggle links each picotally connected at one end thereof to a respective one of said first set of segments and at the other end thereof to the mentioned portion of a respective one of said second set of rocker arms allowing relative movement therebetween and causing said second set of rocker arms to pivot as said actuator moves along said axis, whereupon movement of said actuator along said axis imparts pivotal movement to said rocker arms through said first and second sets of segments and whereby engagement of said workpiece by one set of jaws prior to the other set of jaws prevents further movement of said one set of jaws until the other set of jaws engages said workpiece through relative radial movement between said first and second sets of segments whereby said workpiece is equally pressurized by said first and second sets of jaws.

11. A chuck having two sets of gripping jaws arranged in staggered relation with respect to each other circumferentially of the chuck and adapted to grip a workpiece, said jaws being movable toward and away from a central axis by movement of an actuator, a plurality of mutually coactive, jointly operative means interconnecting said actuator and jaws for normally providing substantially equal radial movement of the jaws of each set while permitting movement of one set of jaws a different radial distance than the other set of jaws to compensate for variations in the workpiece surface and to hold said workpiece with substantially equal force at all of said jaws.

12. A chuck comprising a rotatable body, an actuator in and mounted for reciprocation along the axis of said body, a first set of equidistantly spaced work engaging jaws arranged concentrically to the axis of said body and adapted to engage a workpiece, a pivotally mounted first set of rocker arms each carrying a respective one of said first set of jaws and each having a first portion extending within said body, a first set of segments carried by said actuator and radially movable relative thereto, means interconnecting each of said first set of segments with a first portion of a respective one of the rocker arms of said first set for relative longitudinal and pivotal movement therebetween, whereby movement of said actuator along said axis imparts pivotal movement to said rocker arms, a second set of equidistantly spaced work engaging jaws staggered relative to the jaw elements of said first set and concentric to the body axis and adapted to engage said workpiece, a pivotally mounted second set of rocker arms each carrying a respective one of said jaws of said second set and each having a first portion extending within said body, a second set of segments carried by said actuator disposed between and operatively engaging the segments of said first set of segments and radially movable relative thereto, means interconnecting each of said second set of segments with a first portion of a respective one of said second set of rocker arms for relative longitudinal and pivotal movement therebetween, whereby movement of said actuator along said longitudinal axis imparts pivotal movement to said rocker arms through said first and second sets of segments and engagement of said workpiece by one set of jaws prior to the other set of jaws causes a relative radial movement between said first and second sets of segments thereby permitting said first and second sets of jaws to move different radial distances.

13. A chuck comprising
a body,
a plurality of longitudinal rocker arms swivelly mounted for pivotal rocking movement at the front and spaced equidistantly circumferentially of said body,
work holding jaws on the forward ends of said rocker arms,
an advanceable and retractable actuator at the rear of the body,
means for translating advancing and retracting movement of said actuator into rocking movement of said arms including
 a plurality of mutually coactive, jointly operable individually radially shiftable, generally pie-shaped segmental members carried by the actuator, and
 means connecting said segmental members to the rear portions of said rocker arms,
  movement of said actuator in one direction acting through said segmental members and said rocker arms to engage said jaws with a workpiece,
  said segmental members adapted to shift radially each independently of the others upon engagement of the jaws with the work as required to bring all of the jaws into clamping engagement with the work.

14. A chuck comprising
a body;
a plurality of longitudinal rocker arms swivelly mounted for pivotal rocking movement at the front of said body;
work holding jaws on the forward ends of said rocker arms;
an advanceable and retractable actuator at the rear of the body; and
means for translating advancing and retracting movement of said actuator into rocking movement of said arms including
 a plurality of individually radially shiftable, segmental members carried by the actuator,
  the rear portions of said rocker arms being disposed in acute angular relation with respect to the axis of the chuck,
  the rear portions of said arms also extending through respective segmental members, and fastened thereto by swivel connections,
  movement of said actuator in one direction acting through said segmental members and said rocker arms to engage said jaws with a workpiece,
  said segmental members adapted to shift radially each independently of the others upon engagement of the jaws with the work as required to bring all of the jaws into clamping engagement with the work.

15. A chuck comprising
a body;
a plurality of longitudinal rocker arms swivelly mounted for pivotal rocking movement at the front of said body;
work holding jaws on the forward ends of said rocker arms;
an actuator mounted for reciprocation in said chuck body; and
means for translating advancing and retracting movement of said actuator into rocking movement of said arms including
 a plurality of individually radially shiftable, segmental members carried by the actuator,
  each of said rocker arms being connected to a respective one of said segmental members by
 a pivoted toggle link,
  movement of said actuator in one direction acting through said segmental members and said rocker arms to engage said jaws with a workpiece,
  said segmental members adapted to shift radially each independently of the others upon engagement of the jaws with the work as required to bring all of the jaws into clamping engagement with the work.

16. A chuck comprising
a body;
a plurality of longitudinal rocker arms swivelly mounted for pivotal rocking movement at the front of said body;
work holding jaws on the forward ends of said rocker arms;
 said work holding jaws being arranged in two sets spaced different distances from the front or face of the chuck body;
an advanceable and retractable actuator at the rear of the body; and
means for translating advancing and retracting movement of said actuator into rocking movement of said arms including
 a plurality of individually radially shiftable, segmental members carried by the actuator, and
 means connecting said segmental members to the rear portions of said rocker arms,
  the rocker arms carrying each set of work holding jaws being connected to alternate segmental members,
  movement of said actuator in one direction acting through said segmental members and said rocker arms to engage said jaws with a workpiece,
  said segmental members adapted to shift radially each independently of the others upon engagement of the jaws with the work as required to bring all of the jaws into clamping engagement with the work.

17. A chuck comprising
a body;
a plurality of longitudinal rocker arms swivelly mounted for pivotal rocking movement at the front of said body;
work holding jaws on the forward ends of said rocker arms;
an advanceable and retractable actuator at the rear of the body; and
means for translating advancing and retracting movement of said actuator into rocking movement of said arms including
    a plurality of individually radially shiftable, segmental members carried by the actuator,
    means connecting said segmental members to the rear portions of said rocker arms, and
    means for preventing said segments from separating radially simultaneously from said actuator during movement of the latter in one direction so that movement of the actuator in said one direction acts through said segments and said rocker arms to open said jaws,
        movement of said actuator in the opposite direction acting through said segmental members and said rocker arms to engage said jaws with a workpiece,
        said segmental members adapted to shift radially each independently of the others upon engagement of the jaws with the work as required to bring all of the jaws into clamping engagement with the work.

18. A chuck comprising
a body;
a plurality of longitudinal rocker arms swivelly mounted for pivotal rocking movement at the front of said body;
work holding jaws on the forward ends of said rocker arms;
an advanceable and retractable actuator at the rear of the body; and
means for translating advancing and retracting movement of said actuator into rocking movement of said arms including
    a plurality of individually radially shiftable, segmental members carried by the actuator,
    means connecting said segmental members to the rear portions of said rocker arms, and
    a flexible spring metal band surrounding and confining said segmental members to prevent the latter from separating radially simultaneously from said actuator during movement of the latter in one direction so that movement of the actuator in said one direction acts through said segments and said rocker arms to open said jaws,
        movement of said actuator in the opposite direction acting through said segmental member to engage said jaws with a workpiece,
        said segmental members adapted to shift radially each independently of the others upon engagement of the jaws with the work as required to bring all of the jaws into clamping engagement with the work.

19. A chuck comprising
a body;
a plurality of longitudinal rocker arms swivelly mounted for pivotal rocking movement at the front of said body;
work holding jaws on the forward ends of said rocker arms;
an advanceable and retractable actuator at the rear of the body; and
means for translating advancing and retracting movement of said actuator into rocking movement of said arms including
    a plurality of individually radially shiftable, segmental members carried by the actuator,
    means connecting said segmental members to the rear portions of said rocker arms, and
    sliding connections joining each of said segmental members to adjacent segmental members whereby to prevent said segmental members from separating radially in use while permitting each segmental member to shift radially independently of the others,
        movement of said actuator in one direction acting through said segmental members and said rocker arms to engage said jaws with a workpiece,
        said segmental members adapted to shift radially each independently of the others upon engagement of the jaws with the work as required to bring all of the jaws into clamping engagement with the work.

20. A chuck comprising
a body;
a plurality of longitudinal rocker arms swivelly mounted for pivotal rocking movement at the front of said body;
work holding jaws on the forward ends of said rocker arms;
an advanceable and retractable actuator at the rear of the body; and
means for translating advancing and retracting movement of said actuator into rocking movement of said arms including
    a plurality of individually radially shiftable, segmental members carried by the actuator,
    wedge members interposed between said segmental members and said actuator,
    spring means coacting with said segmental members holding the latter yieldingly in pressed engagement with said wedge members, and
    means connecting said segmental members to the rear portions of said rocker arms,
        movement of said actuator in one direction acting through said segmental members and said rocker arms to engage said jaws with a workpiece,
        said segmental members adapted to shift radially each independently of the others upon engagement of the jaws with the work as required to bring all of the jaws into clamping engagement with the work,
        each of said wedge members engaging a pair of adjacent segmental members and being laterally movable relative to said actuator to compensate for radial shifting movement of said segmental members.

21. A chuck comprising
a body;
a plurality of longitudinal rocker arms swivelly mounted for pivotal rocking movement at the front of said body;
work holding jaws on the forward ends of said rocker arms;
an advanceable and retractable actuator at the rear of the body; and
means for translating advancing and retracting movement of said actuator into rocking movement of said arms including
    a plurality of individually radially shiftable, segmental members carried by and reciprocable with said actuator,
    wedge members interposed between and seating against said segmental members and said actuator,
        each of said wedge members engaging a pair of adjacent segmental members and being laterally movable on said actuator to compensate for radial shifting movement of said segmental members.

a band of spring metal surrounding said segmental members holding all of the latter yieldingly in pressed engagement with said wedge members but adapted to flex in use to permit radial shifting movement of said segmental members, and means connecting said segmental members to the rear portions of said rocker arms, movement of said actuator in one direction acting through said segmental members and said rocker arms to engage said jaws with with a workpiece, said segmental members adapted to shift radially each independently of the others upon engagement of the jaws with the work as required to bring all of the jaws into clamping engagement with the work.

References Cited

UNITED STATES PATENTS

| | | | |
|---|---|---|---|
| 2,565,430 | 8/1951 | Hohwart | 279—1 |
| 3,006,653 | 10/1961 | Benjamin | 279—1 |
| 3,099,457 | 7/1963 | Hohwart | 279—106 |
| 1,022,761 | 4/1912 | Stvanek | 279—107 |
| 1,999,031 | 4/1935 | Burger | 279—119 |
| 2,494,166 | 1/1950 | Drissner | 279—106 |
| 2,775,461 | 12/1956 | Ehrlich | 279—119 |
| 2,916,290 | 12/1959 | Skillen | 279—1 |

FOREIGN PATENTS

| | | |
|---|---|---|
| 926,404 | 4/1955 | Germany. |

ROBERT C. RIORDON, *Primary Examiner.*

LESTER M. SWINGLE, *Examiner.*

E. A. CARPENTER, J. M. McKEOWN,
*Assistant Examiners.*